(12) United States Patent
Gates et al.

(10) Patent No.: US 8,754,859 B2
(45) Date of Patent: Jun. 17, 2014

(54) ELECTRO-OPTIC DISPLAYS WITH TOUCH SENSORS AND/OR TACTILE FEEDBACK

(75) Inventors: Holly G. Gates, Somerville, MA (US); Robert W. Zehner, Belmont, MA (US); Russell J. Wilcox, Natick, MA (US); Matthew J. Aprea, Wellesley, MA (US)

(73) Assignee: E Ink Corporation, Billerica, MA (US)

( * ) Notice: Subject to any disclaimer, the term of this patent is extended or adjusted under 35 U.S.C. 154(b) by 93 days.

(21) Appl. No.: 12/914,504

(22) Filed: Oct. 28, 2010

(65) Prior Publication Data

US 2011/0310459 A1 Dec. 22, 2011

Related U.S. Application Data

(60) Provisional application No. 61/255,580, filed on Oct. 28, 2009.

(51) Int. Cl.
*G06F 3/041* (2006.01)
*G02B 6/06* (2006.01)
*G02F 1/03* (2006.01)

(52) U.S. Cl.
USPC ........... 345/173; 345/107; 345/175; 345/176; 250/208.1; 250/227.2; 250/552; 250/553; 359/245; 359/263; 359/296; 359/298; 359/315; 359/318

(58) Field of Classification Search
USPC ............... 359/245, 263, 296, 298, 315, 318; 345/107, 173, 175, 176; 250/332, 250/227.2, 227.28, 227.31, 573, 495.1, 250/363.01, 363.08, 552, 553, 208.1
See application file for complete search history.

(56) References Cited

U.S. PATENT DOCUMENTS

| | | | |
|---|---|---|---|
| 4,418,346 | A | 11/1983 | Batchelder |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |
| 6,054,071 | A | 4/2000 | Mikkelsen, Jr. |
| 6,055,091 | A | 4/2000 | Sheridon et al. |
| 6,097,531 | A | 8/2000 | Sheridon |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |

(Continued)

OTHER PUBLICATIONS

Bach, U., et al., "Nanomaterials-Based Electrochromics for Paper-Quality Displays", Adv. Mater, 14(11), 845 (2002).

(Continued)

*Primary Examiner* — Evelyn A. Lester
(74) *Attorney, Agent, or Firm* — David J. Cole

(57) ABSTRACT

An electro-optic display comprises, in order, a light-transmissive electrically-conductive layer; a layer of a solid electro-optic material; and a backplane (162) bearing a plurality of pixel electrodes. A peripheral portion of the backplane extends outwardly beyond the layer of solid electro-optic material and bears a plurality of radiation generators (166) and a plurality of radiation detectors (168), the radiation generators and detectors together being arranged to act as a touch screen.

8 Claims, 12 Drawing Sheets

(56) References Cited

U.S. PATENT DOCUMENTS

| | | |
|---|---|---|
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,252,564 B1 | 6/2001 | Albert et al. |
| 6,271,823 B1 | 8/2001 | Gordon, II et al. |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,724,519 B1 | 4/2004 | Comiskey et al. |
| 6,738,050 B2 * | 5/2004 | Comiskey et al. ............ 345/107 |
| 6,750,473 B2 | 6/2004 | Amundson et al. |
| 6,788,449 B2 | 9/2004 | Liang et al. |
| 6,816,147 B2 | 11/2004 | Albert |
| 6,819,471 B2 | 11/2004 | Amundson et al. |
| 6,825,068 B2 | 11/2004 | Denis et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,030,412 B1 | 4/2006 | Drzaic et al. |
| 7,030,854 B2 | 4/2006 | Baucom et al. |
| 7,075,502 B1 | 7/2006 | Drzaic et al. |
| 7,075,703 B2 | 7/2006 | O'Neil et al. |
| 7,106,296 B1 | 9/2006 | Jacobson |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,291 B2 | 6/2007 | Kaga et al. |
| 7,256,766 B2 | 8/2007 | Albert et al. |
| 7,259,744 B2 | 8/2007 | Arango et al. |
| 7,280,094 B2 | 10/2007 | Albert |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,411,719 B2 | 8/2008 | Paolini, Jr. et al. |
| 7,420,549 B2 | 9/2008 | Jacobson et al. |
| 7,442,587 B2 | 10/2008 | Amundson et al. |
| 7,453,445 B2 | 11/2008 | Amundson |
| 7,492,497 B2 | 2/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini et al. |
| 7,688,497 B2 | 3/2010 | Danner et al. |
| 7,705,824 B2 | 4/2010 | Baucom et al. |
| 7,785,988 B2 | 8/2010 | Amundson et al. |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,893,435 B2 | 2/2011 | Kazlas et al. |
| 7,898,717 B2 | 3/2011 | Patry et al. |
| 7,957,053 B2 | 6/2011 | Honeyman et al. |
| 8,009,348 B2 | 8/2011 | Zehner et al. |
| 8,027,081 B2 | 9/2011 | Danner et al. |
| 8,049,947 B2 | 11/2011 | Danner et al. |
| 8,089,453 B2 | 1/2012 | Comiskey et al. |
| 8,319,759 B2 | 11/2012 | Jacobson et al. |
| 8,389,381 B2 | 3/2013 | Amundson et al. |
| 8,482,835 B2 | 7/2013 | LeCain et al. |
| 2002/0060321 A1 | 5/2002 | Kazlas et al. |
| 2003/0058223 A1 | 3/2003 | Tracy et al. |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2007/0052757 A1 | 3/2007 | Jacobson |
| 2007/0097489 A1 | 5/2007 | Doshi et al. |
| 2007/0211002 A1 | 9/2007 | Zehner et al. |
| 2008/0054879 A1 | 3/2008 | LeCain et al. |
| 2009/0004442 A1 | 1/2009 | Danner |
| 2009/0122389 A1 | 5/2009 | Whitesides et al. |
| 2009/0237773 A1 | 9/2009 | Cao et al. |
| 2009/0315044 A1 | 12/2009 | Amundson et al. |
| 2010/0118384 A1 | 5/2010 | Danner et al. |

OTHER PUBLICATIONS

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Hayes, R.A., et al., "Video-Speed Electronic Paper Based on Electrowetting", Nature, vol. 425, Sep. 25, pp. 383-385 (2003).

* cited by examiner

ELECTRO-OPTIC DISPLAYS WITH TOUCH SENSORS AND/OR TACTILE FEEDBACK

REFERENCE TO RELATED APPLICATIONS

This application claims benefit of copending Application Ser. No. 61/255,580, filed Oct. 28, 2009.

This application is related to:

(a) U.S. Pat. Nos. 6,473,072 and 6,738,050;
(b) U.S. Pat. Nos. 7,030,854; 7,312,784; and 7,705.824;
(c) U.S. Pat. No. 6,392,786;
(d) U.S. Pat. No. 7,110,164; and
(e) U.S. Pat. Nos. 6,473,072 and 6,738,050.

The entire contents of these patents and application, and of all other U.S. patents and published and copending applications mentioned below, are herein incorporated by reference.

BACKGROUND OF INVENTION

This application relates to electro-optic displays provided with touch sensors and/or tactile feedback. This invention is primarily directed to such electro-optic displays which use solid electro-optic media, as that term is defined below.

The term "electro-optic", as applied to a material, medium or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18 (3), 24 (March 2002). See also Bach, U., et al., Adv. Mater., 2002, 14 (11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media.

Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. No. 6,982,178 and U.S. Patent Application Publication No. 2007/0109219;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; and 7,785,988; and U.S. Patent Applications Publication Nos. 2002/0060321; 2004/0105036; 2004/0180476; 2005/0122306; 2005/0122563; 2007/0052757; 2007/0085818; 2007/0097489; 2007/0109219; 2007/0211002; 2008/0211765; 2009/0122389; 2009/0225397; 2009/0231661; 2009/0315044; 2010/0039697; 2010/0039706; 2010/0118384; 2010/0165446; and 2010/0265239; International Application Publication No. WO 00/38000; European Patents Nos. 1,099,207 B1 and 1,145,072 B1;

(e) Color formation and color adjustment; see for example U.S. Pat. No. 7,075,502 and U.S. Patent Application Publication No. 2007/0109219;

(f) Methods for driving displays; see for example U.S. Pat. Nos. 7,012,600 and 7,453,445;

(g) Applications of displays; see for example U.S. Pat. No. 7,312,784 and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

It is known (see the patents and application mentioned in the "Reference to Related Applications section above) to provide electro-optic displays with touch screens. Many display applications benefit from touch sensitivity. In many cases, touch sensitivity in a limited number of fixed areas can be used for elements of the user interface. Alternatively, applications such as drawing, underlining, or complex and changeable user interfaces benefit from a full touch screen. Touch sensing capabilities also offer the possibility of producing an electronic paper-like display which mimics not only the readability but also the writeability of conventional paper. The ability to detect, at frequent intervals, the position of a finger or stylus on a display screen, enables a display to use the position information to effect selection of menu items or to capture handwriting as "digital ink".

Although touch sensing is not strictly a display function, the touch sensor is typically considered part of the display because it must be co-located with the display (either above or below the display surface). Unfortunately, most touch screen technologies are not suitable for use with portable products using electrophoretic displays. Of the types of touch screen which are inexpensive, compact, and sufficiently low in power demand to address such displays, many require multiple layers and/or interfaces to be stacked on top of the display medium. Since electrophoretic displays are reflective, optical performance is reduced by each additional layer and interface interposed between the electro-optic layer and the user. Many types of touch screen also add excessive thickness to the display stack, and require multiple additional processing steps to form the complete display panel.

Inductive touch screens can be placed behind the backplane layer (i.e., on the opposed side of the backplane to both the user and the electro-optic medium), and thus do not affect optical performance. Such inductive touch screens also add minimal thickness, but they are expensive and require use of a special stylus.

Surface capacitive touch screens are a promising avenue for use with electro-optic displays. This type of touch screen is typically laminated or positioned over the front of a finished display. As shown in FIG. 1A of the accompanying drawings, a typical form of such a touch screen has a substrate 1, typically formed of poly(ethylene terephthalate) (PET) having a thickness in the range of about 50 to about 250 µm. A light-transmissive, electrically-conductive layer 2 is formed on the surface of the substrate 1. The layer 2 may be formed of indium tin oxide (ITO) or any other light-transmissive electrical conductor, for example PEDOT, carbon nanotubes or other inorganic conductors. The touch screen actually works better if the resistance of the layer 2 is not too low, a preferred range being about 1 to 5 Kohm/square, a range which can be achieved by ITO or various polymeric conductors. A low sheet resistance material 3 (typically screen printed silver ink) is formed and patterned in contact with the conductive layer 2. As discussed below, the various parts of the material 3 serve several functions.

As illustrated in FIG. 1B, the material 3 includes corner electrodes 4 that make good electrical contact with the corners of the layer 2 and which are in electrical contact with a touch screen controller (not shown) via connector points 6. The corner electrodes 4 are the primary points the controller uses to inject measurement signals and sense changes in capacitance in order to detect touches on the screen. The material 3 also provides a linearization pattern 5, which selectively shorts out sections at the edges of the sheet conductor and causes the electrical field distribution to spread out over the screen more linearly than it otherwise would. Without the pattern 5, the electrical field would be subject to severe pincushion distortion and it would be difficult to implement a useful touch sensor. The connector points 6 are, as already noted, used to form connections from the touch screen to the controller; usually, these connections are provided in the form of a small flexible circuit tail ACF or conductive adhesive bonded to the connector points 6. Finally, the material 3 forms a proximity sensing electrode 7, which is needed in small surface capacitance screen to detect when a user approaches the screen. The proximity sensing electrode 7 can be a ring electrode encircling the screen, as illustrated in FIG. 1B, or may be formed as a separate layer (for example, an aluminized polymeric film in the form of a die cut ring) laminated to the peripheral portion of the screen to reduce the footprint of the touch sensor features at the edge of the display.

SUMMARY OF THE INVENTION

In one aspect, this invention provides several methods for integrating capacitive touch sensors into a front plane laminate to produce a single film ready for assembly into a display. Electrophoretic and other bistable electro-optic media allow tighter integration of touch screens than is possible in liquid crystal displays because the bistable nature of the electro-optic medium potentially allows multiplexing of various electrode structures within the display between driving the display and sensing user input. This is not possible in liquid crystal displays; since such displays need to be driven continuously, no opportunity exists for using any display structures for touch sensing.

Another aspect of the present invention provides a display provided with a proximity sensing device which detects when a user is in close proximity to the display or, more specifically, to the screen thereof.

A third aspect of the present invention relates to incorporation of resistive touch sensors into electro-optic displays.

A fourth aspect of the present invention relates to integration of a display and a key input device in an electro-optic display.

More specifically, in one aspect this invention provides an electro-optic display comprising, in order:
 a light-transmissive electrically-conductive layer, a peripheral portion of which bears a plurality of conductive members having a conductivity higher than that of the electrically-conductive layer;
 a layer of a solid electro-optic material; and a backplane bearing a plurality of pixel electrodes,
the electro-optic display further comprising means for controlling the potential of the plurality of conductive members, such that the plurality of conductive members and the light-transmissive electrically-conductive layer can serve as a touch screen.

In another aspect, this invention provides an article of manufacture (a front plane laminate) comprising, in order:
a light-transmissive electrically-conductive layer, a peripheral portion of which bears a plurality of conductive members having a conductivity higher than that of the electrically-conductive layer;
a layer of a solid electro-optic material;
a layer of a lamination adhesive; and
a release sheet.

In another aspect, this invention provides an electro-optic display comprising, in order:
a light-transmissive electrically-conductive layer, a peripheral portion of which bears a plurality of conductive members having a conductivity higher than that of the electrically-conductive layer;
a light-transmissive electrically insulating layer;
a light-transmissive electrically-conductive layer;
a layer of a solid electro-optic material; and
a backplane bearing a plurality of pixel electrodes,
the electro-optic display further comprising means for controlling the potential of the plurality of conductive members, such that the plurality of conductive members and the light-transmissive electrically-conductive layer can serve as a touch screen.

In another aspect, this invention provides an article of manufacture (a front plane laminate) comprising, in order:
a light-transmissive electrically-conductive layer, a peripheral portion of which bears a plurality of conductive members having a conductivity higher than that of the electrically-conductive layer;
a light-transmissive electrically insulating layer;
a light-transmissive electrically-conductive layer;
a layer of a solid electro-optic material; and
a layer of a lamination adhesive; and
a release sheet.

In another aspect, this invention provides an electro-optic display comprising, in order:
a light-transmissive electrically-conductive layer;
a layer of a solid electro-optic material;
a backplane bearing a plurality of pixel electrodes; and
first and second electrically conductive layers spaced apart from another but capable of being deformed towards one another, the first and second electrically conductive layers forming a touch screen.

In another aspect, this invention provides an electro-optic display comprising, in order:
a light-transmissive electrically-conductive layer;
a layer of a solid electro-optic material; and
a backplane bearing a plurality of pixel electrodes, a peripheral portion of the backplane extending outwardly beyond the layer of solid electro-optic material, the peripheral portion of the backplane bearing a plurality of radiation generating means and a plurality of radiation detecting means, the plurality of radiation generating means and plurality of radiation detecting means together being arranged to act as a touch screen.

BRIEF DESCRIPTION OF THE DRAWINGS

As already mentioned.

DETAILED DESCRIPTION

As indicated above, in one aspect the present invention provides several methods for integrating capacitive touch sensors into a front plane laminate to produce a single film ready for assembly into a display.

Figure 1A:
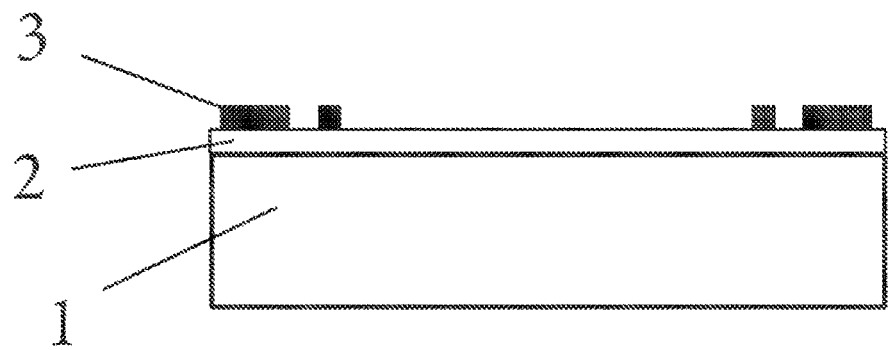
FIG. 1A is a schematic cross-section through a prior art touch screen.
Figure 1B:
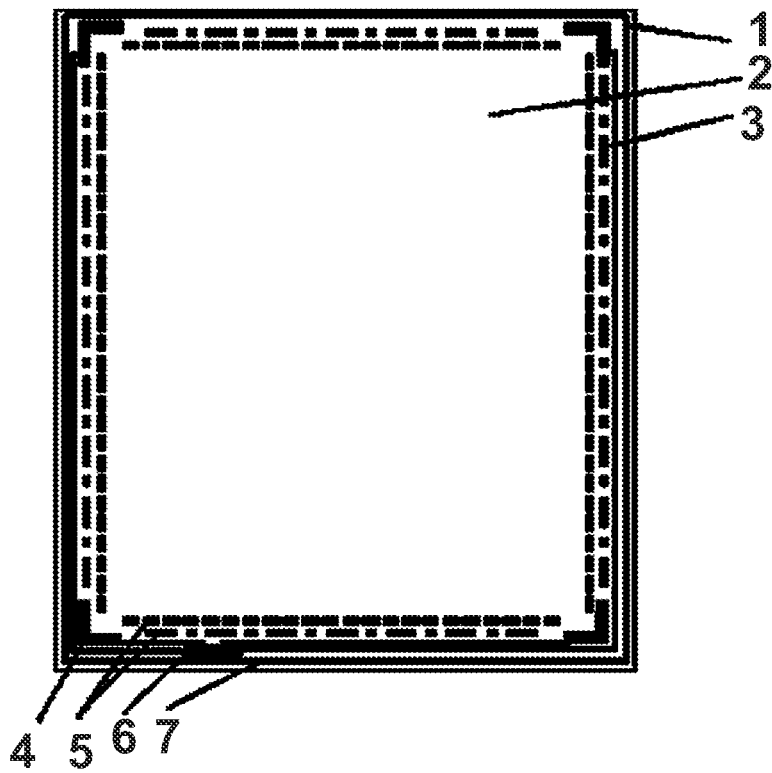
FIG. 1B is a schematic top plan view of the touch screen shown in FIG. 1A.
Figure 2:
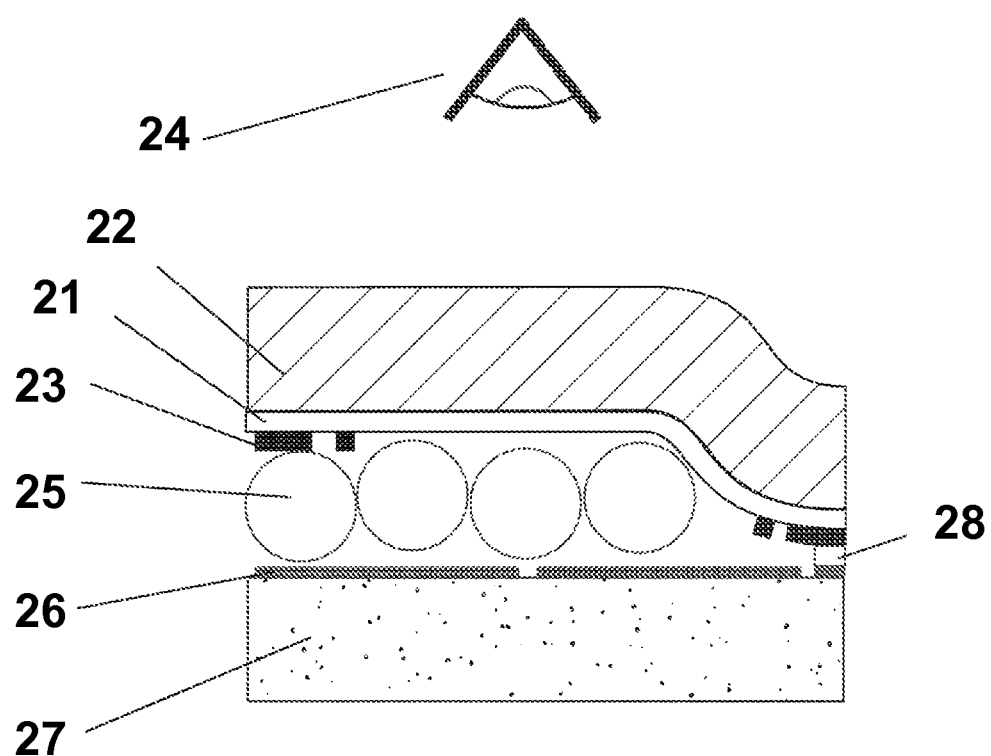
FIG. 2 is a schematic cross-section through a first electro-optic display of the present invention having a touch screen incorporated into the front electrode of the display.

As illustrated in FIG. 2, the most straightforward way to effect such integration is to make a single conductive layer 21 serve as both the conductive layer of the touch screen and the top electrode of the display. In the structure of FIG. 2, a front substrate 22, which serves as both the substrate of the touch screen and the front substrate of the display, faces a viewer 24. The low sheet resistance material 23 (similar to the material 3 in FIGS. 1A and 1B) lies adjacent an electro-optic layer (illustrated as a microencapsulated electrophoretic layer 25) provided with pixel electrodes 26 on a backplane 27. (Although not shown in FIG. 2, there is normally a layer of lamination adhesive between the electro-optic layer 25 and the pixel electrodes 26; there may also be a second layer of lamination adhesive between the electro-optic layer 25 and the conductive layer 21.) The backplane may be of a direct drive or active matrix type, and may be rigid or flexible. Connections to the conductive layer 21 and the material 23 are effected by edge connections using conductive adhesive, as illustrated at 28, although it should be noted that instead of the single connection to the front electrode normally needed in prior art displays, the device illustrated in FIG. 2 needs five independent connections, one to the front electrode and four to the touch sensor, as described above with reference to FIGS. 1A and 1B.

The display illustrated in FIG. 2 can be produced by only minor modification of the process for constructing an electrophoretic display using a front plane laminate, as described in the aforementioned U.S. Pat. No. 6,982,178. As previously described, the prior art FPL process involves coating an ITO/PET film (available commercially) on its ITO surface with the electrophoretic medium. Separately, a lamination adhesive is coated on to a release sheet, and the resulting sub-assembly is laminated to the electrophoretic medium, with the lamination adhesive in contact with the electrophoretic medium, to form a finished FPL. Removal of the release sheet and lamination of the remaining layers to a backplane bearing pixel electrodes completes the display. To produce the display illustrated in FIG. 2, a closely similar process may be used, except that the low sheet resistance material 23 is printed on to the ITO surface of the ITO/PET film before the electrophoretic medium is coated thereon. The present invention extends to such a modified front plane laminate.

Alternatively, the display shown in FIG. 2 can be produced using an inverted front plane laminate as described in U.S. Patent Application Publication No. 2007/0109219 and/or a double release film as described in U.S. Pat. No. 7,561,324. A double release film of the appropriate time essentially comprises an electro-optic layer sandwiched between two layers of lamination adhesive, with at least one, and preferably both, of the surfaces of the lamination adhesive layers remote from the electro-optic layer being covered by release sheets. To produce a display as shown in FIG. 2 using such a double release film, first modifies the ITO/PET (or similar) film to provide the low sheet resistance material 23 thereon. Next, one of the two release sheets is peeled from the double release film, and the surface of the lamination adhesive thus exposed is laminated (typically under heat and pressure) to the low sheet resistance material 23 and the conductive layer 21, thus forming an inverted front plane laminate. The remaining release sheet is then peeled from the sub-assembly so produced, and the surface of the lamination adhesive thus exposed is laminated (typically under heat and pressure) to the pixel electrodes 26 on the backplane 27 to produce the final display. This second lamination can also form the connection 28. The order of the two laminations can be reversed if desired, although the order just described is generally the most convenient for large scale production.

The use of a double release film in this manner reduces the difficulty and/or inconvenience of coating an electrophoretic medium on to the heterogeneous surface formed by printing the low sheet resistance material 23 on to the ITO surface of the ITO/PET film, since laminating an adhesive layer on the heterogeneous surface is typically easier than coating an electrophoretic medium thereon. Also, the double release film/inverted front plane laminate process provides alternative ways of effecting electrical connections between the front electrode 21 and the backplane 27. If a sufficiently low resistivity conductive pathway could be formed around the entire edge of the active display area, the touch sensor could alternatively be formed in the backplane as part of the pixel electrode layer 10.

Figure 3:
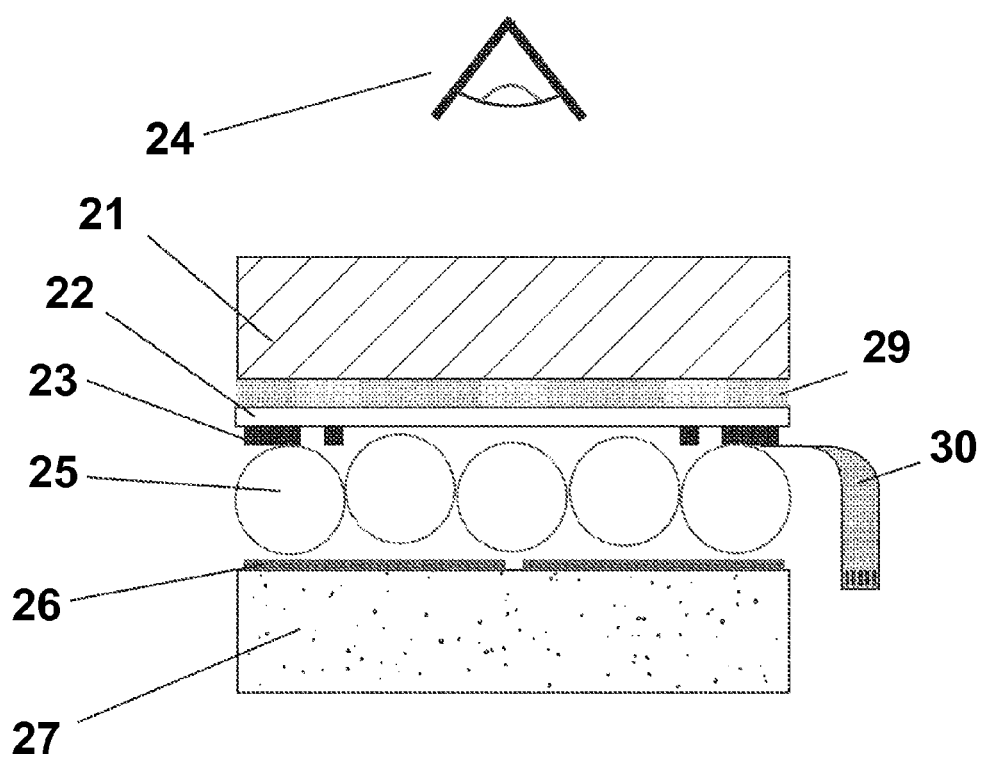
FIG. 3 is a schematic cross-section through a modified form of the first electro-optic display shown in FIG. 2.

FIG. 3 illustrates a touch screen display of the present invention closely resembling that of FIG. 2 but including a color filter array 29. This color filter array is formed on the front substrate 21 and then overcoated with a clear electrically conductive layer 22. As in the display shown in FIG. 2, the only additional step needed in the display manufacturing process is printing the low sheet resistance material 23 on to the electrically conductive layer 22. It will be appreciated that the display shown in FIG. 3 can be produced using a double release film/inverted front plane laminate process exactly analogous to that already described with reference to FIG. 2.

FIG. 3 also illustrates an alternative method of establishing electrical connections to the low sheet resistance material 23 and to the electrically conductive layer 22. Instead of the edge connections shown in FIG. 2, the display of FIG. 3 uses a flexible circuit tail 30 bonded or adhered to the connection pads 6 (see FIG. 1B) of the touch screen. The flexible circuit tail 30 connects to the touch screen controller independently from the backplane (although it could alternatively terminate on the backplane itself, and thence be connected to the controller). The circuit tail 30 thus eliminates the need for a separate connection between the front electrode of the display and the backplane, thus potentially simplifying display construction.

The displays shown in FIGS. 2 and 3 add touch screen functionality to the display with very little additional cost and no impact to optical performance or thickness. The size of the peripheral region between the active area and the physical edge of the display is, however, increased. In both displays, the sensing and display driving phases are distinct in time. During display driving, a common driver circuit would have priority and would be connected to the front electrode, possibly through the touch screen components. When display driving is completed, the common driver circuit can be disabled or disconnected and the touch screen controller connected to the display. Some provision, using analog or transistor switches, will be required to isolate each of the two parts of the circuit when they are not active.

In displays such as those illustrated in FIGS. 2 and 3, where the same front electrode serves as both a driving and a sensing electrode, one potential issue is perturbation of the electro-optic layer by the sensing signals on the top electrode during the touch sensing phase of operation. Sensing signal levels are typically in the 2-3 V range at the corners, which is enough to cause problems in electrophoretic electro-optic layers, either by partial driving or by more subtle degradations of image stability. There are several ways to minimize or eliminate this problem.

Sensing signal frequencies are typically of the order of 10 kHz range, and may thus be high enough not to affect many electro-optic media. It may also be advantageous to have the sensing signal centered around 0 V, so that it is DC balanced. This could be done by changing the output stage of the touch sensor controller, dereferencing the ground of the controller, or by AC coupling the signals through relatively large capacitors between the controller and the panel electrodes.

Another approach is to allow the pixel electrodes to float (i.e., not apply any driving voltage) during the sensing phase. In an active matrix display, this can be done by keeping one rail of the gate drivers on during the sensing phase, thus keeping the transistors non-conductive and allowing the pixels to float individually, and limiting the electric field experienced by the electro-optic layer. Alternatively, the source lines of the array (or the drive lines in a direct drive case display) can be driven with the sensing waveform with the gate drivers all turned on, but implementation of this approach poses practical difficulties.

If the difficulties posed by electrical interference between display driving and touch sensing are deemed too great, or if concurrent or overlapping display driving and touch sensing are necessary to allow for rapid response, as for example in a drawing operation or during fast typing of text input with rapid updating of the display, other forms of integration of a touch sensor into an electro-optic display may be used.

Figure 4:
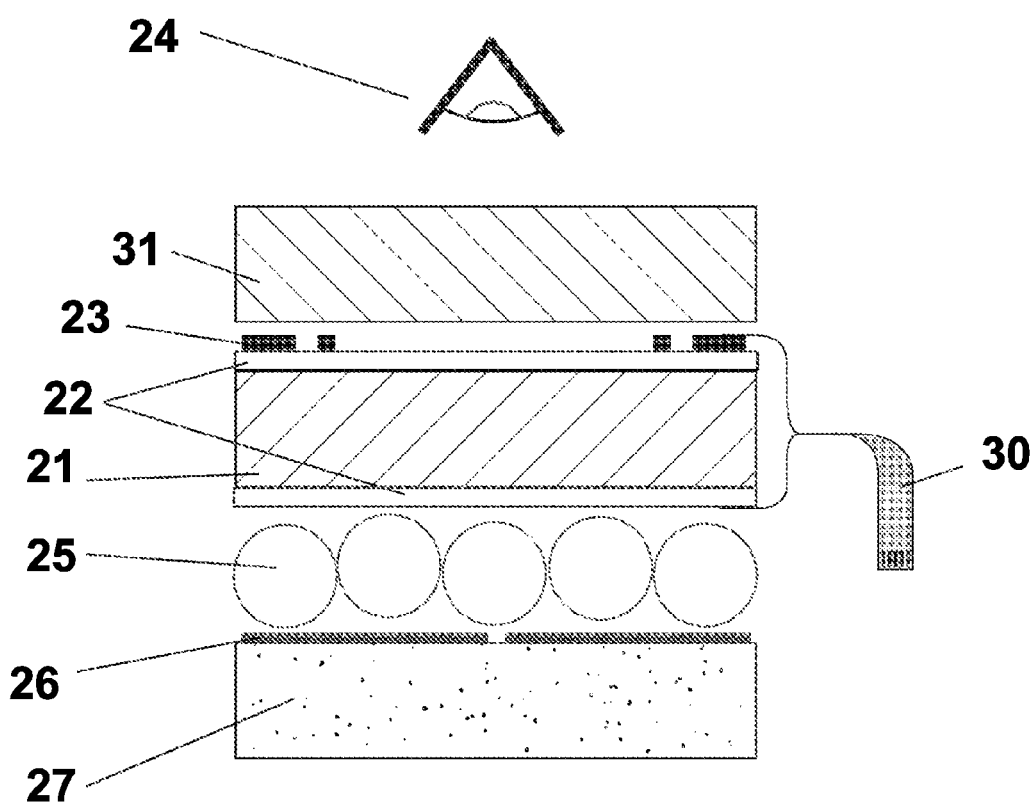
FIG. 4 is a schematic cross-section through a second electro-optic display of the present invention having a front touch screen spaced from the front electrode of the display.

FIG. 4 illustrates one form of such integration, in which the touch screen components are placed on the opposite side of the front substrate from the electro-optic layer, thus separating the sheet conductor 22 of the touch screen from the front electrode of the display. This allows the touch screen sheet conductor can use a material to higher sheet resistance than is desirable for the front electrode of a display, so that the touch screen sheet conductor can be formed of an inexpensive, highly light-transmissive material such as very thin ITO or a conductive polymer. Such a conductive polymer may, in some cases, be applied inexpensively, prior to coating of the electro-optic medium, on to the non-ITO-coated surface of the ITO/PET film in roll form used to prepare front plane laminates, as discussed above, without significant reduction in the light transmission by the film. After a front plane laminate prepared in this manner has been severed into pieces required for a particular size of display, the layer 23 required for the touch screen can be applied.

FIG. 4 illustrates the connections to the touch screen being made via a flexible circuit tale 30, which connects to both the touch screen and the front electrode, thus eliminating the need for a separate connection from the front electrode to the backplane. Alternatively, multilayer screen printing techniques with vias could be used to provide connections between the touch screen and the backplane.

FIG. 4 also illustrates a protective sheet 31 which is typically laminated on top of the front substrate using optically clear adhesive (not shown). The protective sheet 31 is designed to give the display the mechanical durability required for its intended use, and can incorporate ultra violet barriers and diffuse reflective hard coats to provide an attractive and durable front surface on the display. In the display of FIG. 4, the protective sheet also serves to encapsulate and protect the touch screen layers.

The display shown in FIG. 4 can be produced using a modified front plane laminate or a modified double release film/inverted FPL process exactly analogous to those previously described in connection with the display of FIG. 2. To produce the display of FIG. 2, the substrate used to produce the front plane laminate, or the substrate to which the double release film is laminated, may be modified to provide the front electrically-conductive layer 22 and the low sheet resistance material 23 thereon. The protective sheet 31 may also be attached to the substrate at this point, but is typically more conveniently attached at a later stage in the production process.

An alternative to the structure shown in FIG. 4 uses a multilayer conductive coating with intervening dielectric layers on one side of the front substrate 21; within this multilayer conductive coating, a conductive layer closer to the viewing surface of the display can be used as part of the touch screen, while a conductive layer closer to the electro-optic medium would serve as the front electrode of the display. Even a thin dielectric layer interposed between these two conductive layers would block direct current transmission and, at least to some extent, isolate the display driving and touch sensing electrical signals from one another.

Figure 5:
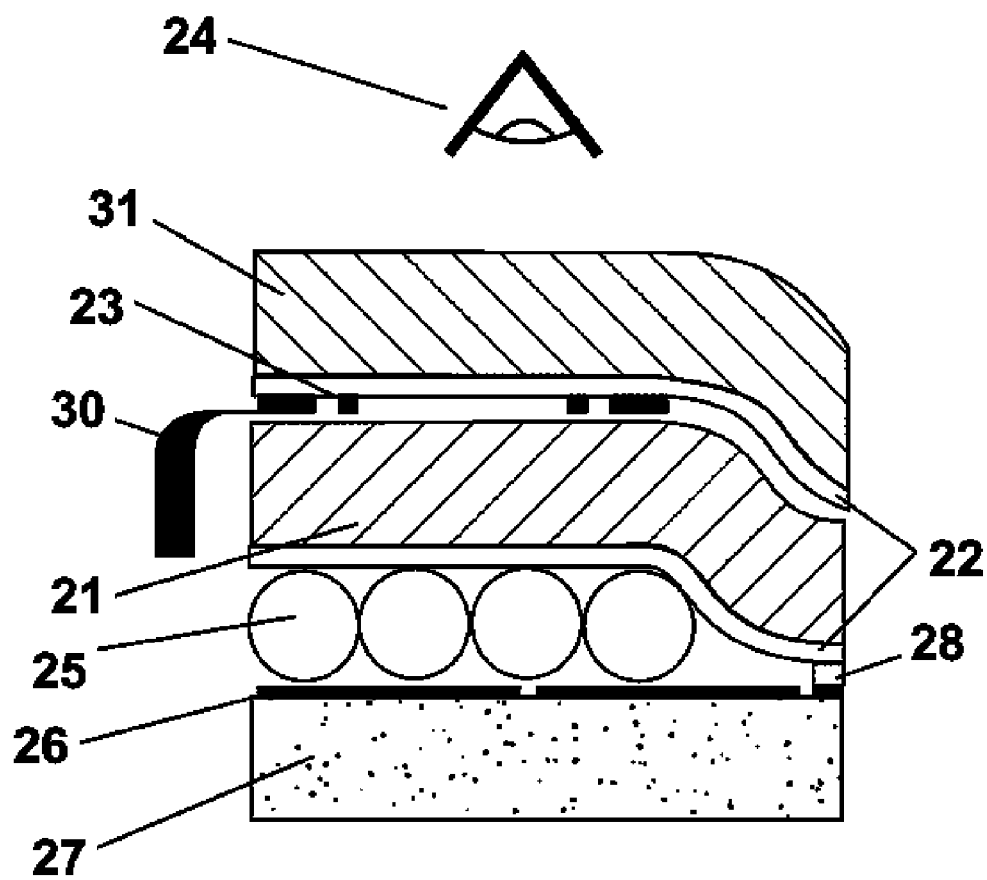
FIG. 5 is a schematic cross-section through a modified form of the second electro-optic display shown in FIG. 4.

Finally, FIG. 5 illustrates a modification of the display of FIG. 4 in which the layer 23 of the touch screen is disposed on the inward surface of the protective sheet 31. In such a display, it will typically be advantageous for the front electrode to connect to the backplane via a edge connector 28, while the touch screen connections pass through a flexible tail 30. Note that the display of FIG. 5 can be produced by modifying only the protective sheet used in the display, and thus may provide a relatively easy path to retrofit an existing design of electro-optic display with a touch sensor when desired.

As already mentioned, a second aspect of the present invention relates to a display provided with a proximity sensing device which detects when a user is in close proximity to the display or, more specifically, to the screen thereof. When a surface capacitive touch sensor is used with a small to medium format display, a proximity sensor is typically needed to determine when the user approaches the display screen and to provide a common mode signal to assist in filtering of the signals from the four corner sensors which, as described above with reference to FIG. 1B, form part of the touch screen. Also, if a battery-driven display uses a bistable electro-optic medium, it is desirable, in order to extend battery life, to shut down power to most parts of the display when the user is not interacting with the display and the display is not being rewritten. A method to detect an approaching user is thus a useful input.

As indicated above in the discussion of the display shown in FIGS. 1A and 1B, a proximity sensing electrode is a standard feature of most surface capacitive touch screens. This second aspect of the present invention relates to methods for providing proximity sensing as part of the backplane of an electro-optic display, or making use of existing backplane features to provide this capacity, together with ways for using proximity sensing in a portable display system using a bistable electro-optic medium. Using a backplane feature to provide proximity sensing in combination with a touch screen provided on the front plane of the display can lead to a smaller border size for the touch screen, and potentially a lower construction cost. (The term "front plane" of a display is used herein in its conventional meaning in the art to refer to the electro-optic layer and all layers of the display between the electro-optic layer and the viewing surface.)

Many electro-optic displays include a border or peripheral electrode, a directly driven electrode positioned around the active area of the display and usually 1 to 3 mm in width. This border electrode serves as a single pixel which ensures that the entire edge of the display is in the same optical state. Without such a border pixel, the address lines extending across the peripheral portion of the display can capacitively switch the electro-optic material above them, producing distracting visual effects. The border electrode also provides some tolerance in positioning the display screen relative to a bezel of a housing.

In a display using a bistable electro-optic medium, the border electrode can be used, by time division multiplexing, both to address the overlying peripheral portion of the electro-optic medium and as a proximity sensing device. Switches, either analog or field effect transistor, could be used to isolate the circuits for these two functions from one another, or it may be possible to design the relevant circuits so that they do not interfere with one another.

Alternatively, dedicated electrodes for the proximity sensor could be provided on backplane. Although such dedicated electrodes might increase the optically inactive areas at the periphery of the backplane, including such dedicated electrodes would be inexpensive since there are already multiple patterned conductor layers on commercial backplanes.

The foregoing proposals assume that a touch screen is built into the front plane of the display. If only proximity sensing is desired and not touch screen capability, the front electrode of the display can be time division multiplexed between driving the display and sensing proximity. FIG. 1B and the related description above describe this approach to providing both proximity sensing and touch screen capabilities, but if only proximity detection is desired, no additional physical features are needed in the display beyond those inherently present; in other words, additional circuitry on the display controller can provide any electro-optic display with proximity sensing capability when the electro-optic medium is not being driven.

Proximity sensing has uses in bistable displays other than those for which such sensing is employed in non-bistable displays. It is desirable that a battery-driven portable bistable display device shut down power to most of the internal systems (i.e., enter a deep sleep mode) when the image on the display is static and there is other device activity. However there is often a significant latency time associated with waking up from a deep sleep mode, especially when powering up a display controller and charging bias supplies is required. Using any of the above techniques, the device use proximity sensing to detect a user approaching and begin the wakeup process expecting that the user will soon wish to interact with the device. Another use could be to refresh an image long present on a screen, and hence somewhat faded, as a user approaches.

Such a sensor could also form a one bit input device for device's user interface; for instance a prompt could say "tap screen to accept", or in an electronic book reader tapping the screen could advance the page. Many display device designs provide two separate connections to the common front electrode, and appropriate control circuits can use the two separate connections as a rudimentary differential proximity sensor. Such a sensor could be used so that, for example, a tap on one side of the screen advances a page and on the other side moves back a page.

As already noted, a third aspect of the present invention relates to incorporation of resistive touch sensors into electro-optic displays. In a conventional resistive touch sensor, two continuous conductive films are separated by an air gap; the spacing between the conductive films is maintained by mechanical spacers placed between them. One film (typically called the "bottom film") is placed on a rigid support, while the other ("top") film is on a deformable substrate. Voltages are applied to the bottom film by means of electrodes along its edges, creating a voltage gradient across the film. When the top film is physically deformed by applied pressure, it comes into contact with the bottom film, creating an electrical circuit between the two layers. By detecting the voltages on the top film by means of electrodes placed at the edges of the top film, the location of the contact in the x and y dimensions can be determined. More elaborate arrangements of electrodes can improve the accuracy of the sensing, especially for larger panels. In some cases, it may even be possible to measure the force of the touch, to the degree that it affects the size of the contact area between the films.

Resistive touch screens have several key advantages over other competing technologies, including low cost, robustness, and sensitivity to any kind of mechanical touch (some other touch sensors only respond to a special stylus, or a human finger). One major disadvantage, however, is the loss in brightness and contrast of the display, as in a reflective display the presence of a resistive touch sensor requires that light reflected from the electro-optic medium make two passes through two additional films. Other disadvantages are the thickness and weight added by the resistive touch system, in which the rigid support must be rigid enough not to deflect when pressure is applied to the front film. This is especially important in liquid crystal displays, the optical properties of which are markedly affected by pressure.

It has been found that, in an electro-optic display, the rigid support of prior art resistive touch sensors can be replaced by a thin and possibly flexible polymeric film, with the rigidity necessary for the operation of the touch sensor being provided by a rigid display backplane underlying this thin polymeric film.

Figure 6:
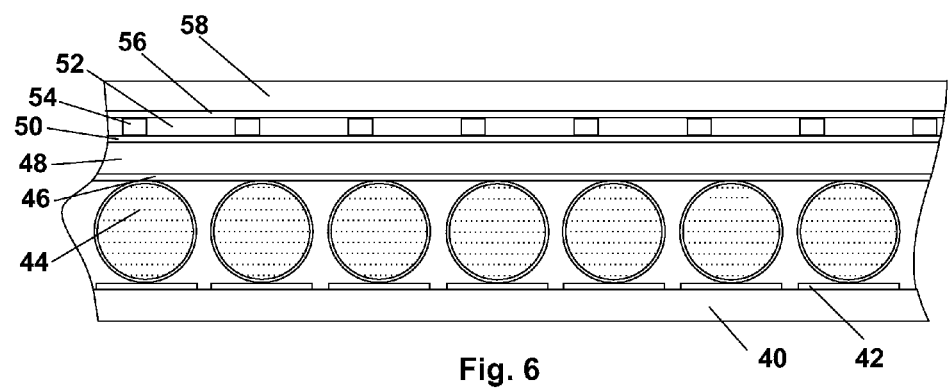
FIGS. 6 and 7 are schematic cross-sections through two different electro-optic displays of the present invention having front resistive touch screens.

An electro-optic display of the present invention having this type of resistive touch sensor is illustrated in schematic cross-section in FIG. 6 of the accompanying drawings. This display comprises (in order from the backplane to the viewing surface), a rigid substrate 40, a thin film transistor active matrix backplane 42, a layer 44 of a solid electro-optic medium (illustrated as an encapsulated electrophoretic medium), a front electrode 46, a transparent substrate 48, a transparent conductive layer 50, which acts as the bottom film of the resistive touch sensor, an air gap 52 defined by spacers 54, a transparent conductive layer 56, which acts as the top film of the resistive touch sensor, and an optically transparent flexible substrate or protective layer 58, which serves to prevent mechanical damage to both the resistive touch sensor and the electro-optic medium.

Figure 7:
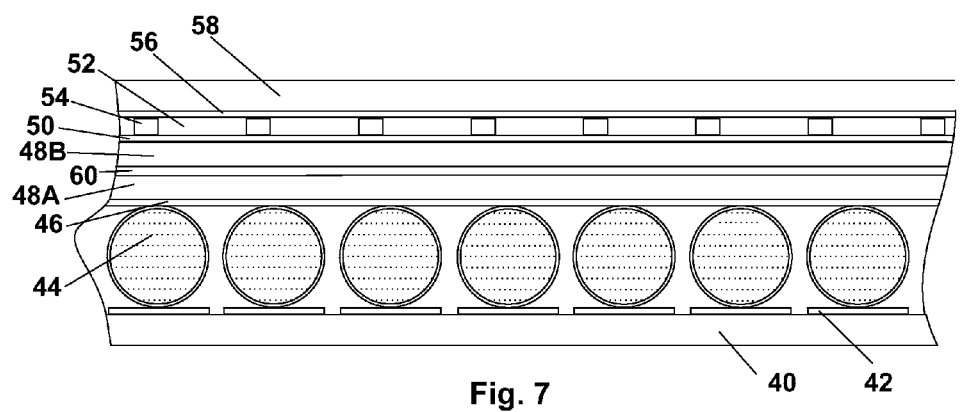

A further electro-optic display having a resistive touch sensor is illustrated in FIG. 7 of the accompanying drawings. The display of FIG. 7 may be regarded as a modification of that shown in FIG. 6, the single transparent substrate 48 shown in FIG. 6 being replaced by two such substrates 48A and 48B adhered to each other by a thin, optically clear adhesive layer 60. It will be seen from FIG. 7 that each of the substrates 48A and 48B bears only a single transparent conductive layer, thus avoiding the need for providing transparent conductive layers on both sides of a single sheet.

The displays shown in FIGS. 6 and 7 can readily be produced using a modified form of the front plane laminate described above with reference to U.S. Pat. No. 6,982,178, in which the front substrate of the front plane laminate is modified to include a second light-transmissive electrically-conductive layer on the opposed side of the front substrate from the release sheet. To produce the electro-optic display of FIG. 7, the modified front substrate may be produced by adhesively securing together two separate substrates each provided with one light-transmissive electrically-conductive layer. The second light-transmissive electrically-conductive layer may optionally be patterned, by screen printing or other process, to provide features needed for its eventual role as the bottom film of the resistive touch sensor. This conductive layer may also be provided with an array of mechanical spacers which will form the spacers 54 in the final display.

The displays shown in FIGS. 6 and 7 can also be modified to use a somewhat flexible backplane, one that can be curved with a large radius of curvature, but still provides enough resistance to mechanical deformation to allow proper operation of the resistive touch sensor. Such a backplane may be based upon a thin metallic foil, as described for example in U.S. Pat. No. 6,825,068 and Publication No. 2004/0180476.

The displays with resistive touch sensors provided by this aspect of the present invention possess cost advantages since they remove one or more of the components and manufacturing steps necessary to incorporate a conventional resistive touch sensor into an electro-optic display, and also possess improved optical performance since elimination of one or more of the layers of a conventional resistive touch sensor improves the optical transparency of the display and decreases the haze thereof, thus improving the dark state of the display. Finally, the displays of the present invention offer reduced thickness and weight of the display by removing the need for the conventional thick heavy bottom substrate.

As already mentioned, a fourth aspect of the present invention relates to integration of a display and a key input device in an electro-optic display. It has long been realized that the type of dedicated, permanently marked keyboard traditionally used in desktop and laptop computers is, by virtue of its size, weight and permanent markings, disadvantageous for use in small portable electronic devices. Accordingly, many electronic devices are now available in which a key-based input function is integrated into the display. For example, Apple's iPhone (Registered Trade Mark) eliminates the traditional keypad in favor of a liquid crystal display equipped with a resistive touch screen. Phone numbers, text messages and other data are entered by contacting an area of the screen delineated by a portion of an image, and interpreted by software.

This kind of "soft" or "virtual" keyboard offers distinct advantages over a traditional keypad, in that the indicia on and/or the locations of the virtual keys can be easily changed by software, this allowing the device to transform the function of the various keys depending on factors such as the local language (different character sets), vision of the user (large text), or the application being used (for example, letters for text entry, numbers for dialing, and special sets of glyphs for particular programs, as for instance when audio or video programs mimic the glyphs conventionally used on dedicated audio or video equipment). In addition, since in conventional cellular telephones and similar portable electronic devices, the display and the keypad each take up about one-half of the usable surface area of the device, elimination of the dedicated keypad in favor of a virtual keyboard enables one to roughly double display size without increasing the overall size of the device.

However, many users complain of the lack of tactile feedback from virtual keyboards. If a user is trying to dial a telephone number while accomplishing another task, such as driving, the flat surface of the display does not offer any clue, other than visual, as to the locations of the keys, or any tactile or audible feedback to indicate when a key has been pressed. This makes it more difficult to dial a telephone number quickly and accurately on a featureless touch screen, and similar difficulties are encountered with other types of input sequences. It is almost impossible to touch type on a virtual keyboard without tactile feedback.

U.S. Patent Application Publication No. US 2003/0058223 describes a deformable display that is placed over an array of membrane switch "popples". Mechanical pressure on the display surface is transmitted through the display to activate the underlying switches, which exhibit a nonlinear force profile as they are deformed (a "click") However, the specific embodiments describe only a keypad equipped with a segmented display capable of displaying a limited set of key labels by direct drive of electrodes.

The present invention provides an electro-optic display comprising an active matrix display overlying an array of switches (keys) that are operated by physical deformation of the display under pressure. The active matrix display displays not only indicia for the keys by also all other data required to be displayed by the application being run, and thus serves as the main screen of the electro-optic display.

Figure 8:
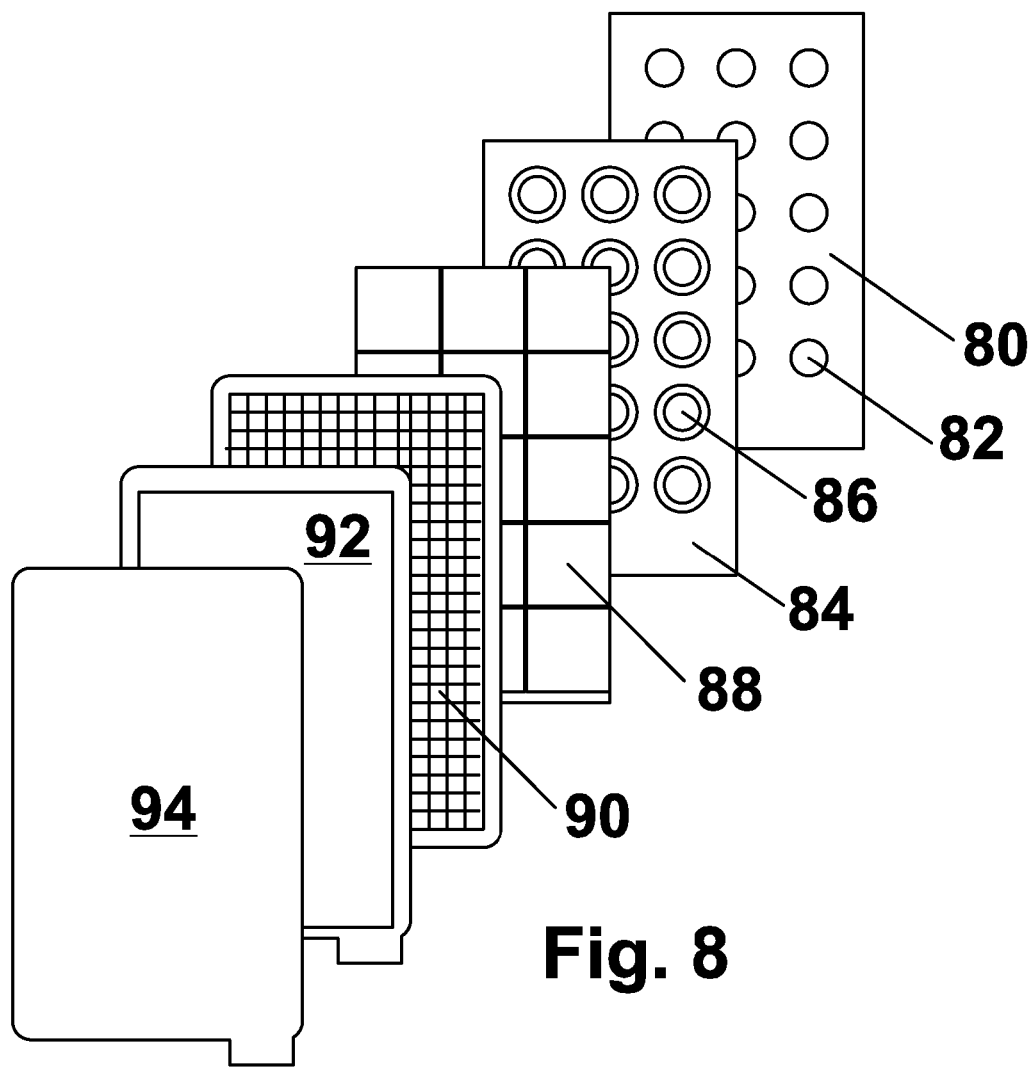
FIG. 8 is an exploded view of a display of the present invention having an array of switches that are operated by physical deformation of the display under pressure.

FIG. 8 of the accompanying drawings is an exploded view of one embodiment of such a display. As seen in that Figure, the display comprises a rear substrate 80 provided with an array of pressure-sensitive switches 82. Overlying the rear substrate is a flexible membrane 84 having raised areas 86 aligned with the switches 82. The next, optional, layer of the display comprises an array of square keys 88 which assist in ensuring that pressure on any area of the display is transmitted to the closest switch 86. Overlying the keys 88 is a flexible TFT array 90, a front plane 92 (comprising an adhesive layer, electro-optic layer and front electrode layer, none of which are shown separately in FIG. 8) and an (optional) protective sheet 94.

Figure 9:
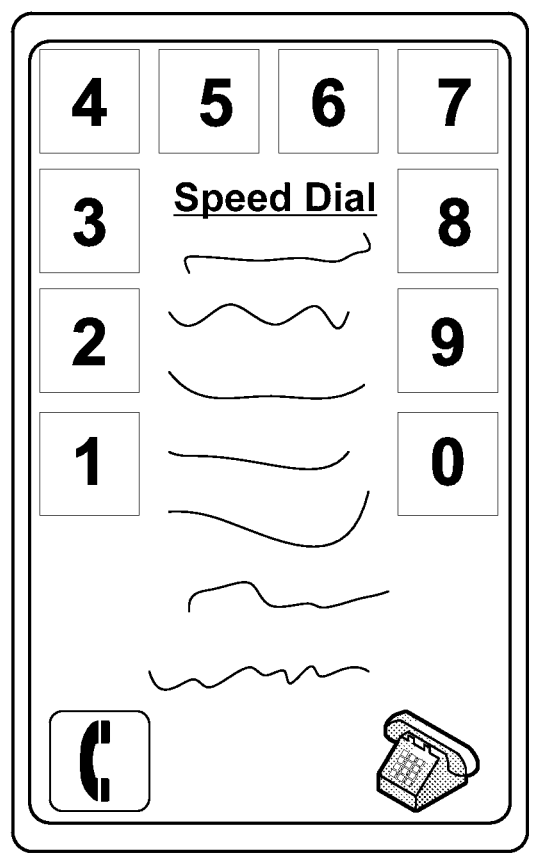
FIG. 9 shows the appearance of the display shown in FIG. 8 when it is running a cellular telephone program.

FIG. 9 shows the appearance of the display shown in FIG. 8 when it is running a cellular telephone program. A U-shaped area extending around the side edges and the top edge of the display shows the digit 0-9. The central portion of the display shows a list of memorized telephone numbers. The lower portion of the display shows icons for dialing a highlighted telephone number from the list and for other functions common to cellular telephones.

Typically, the display itself would comprise a rectilinear array of pixels, each connected to a data bus line by an individual thin film transistor (TFT), controlled by a gate bus line. The TFT array should be constructed on a material that can deform under pressure to activate the underlying keys, for example, PET, polyimide, PEN, or a thin metal substrate, e.g. stainless steel foil.

Figure 10:
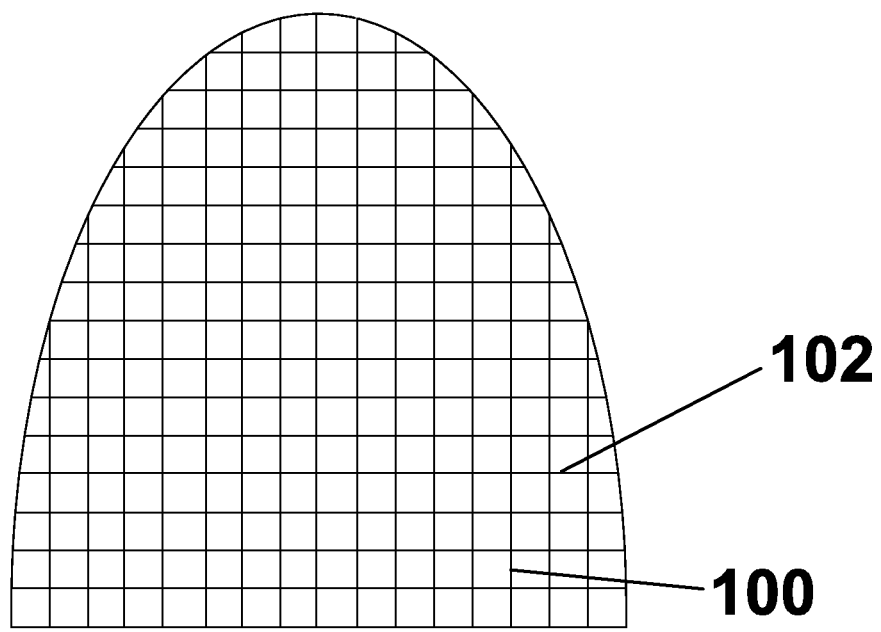
FIG. 10 shows the arrangement of bus lines in a non-rectangular display of the present invention.
Figure 11:
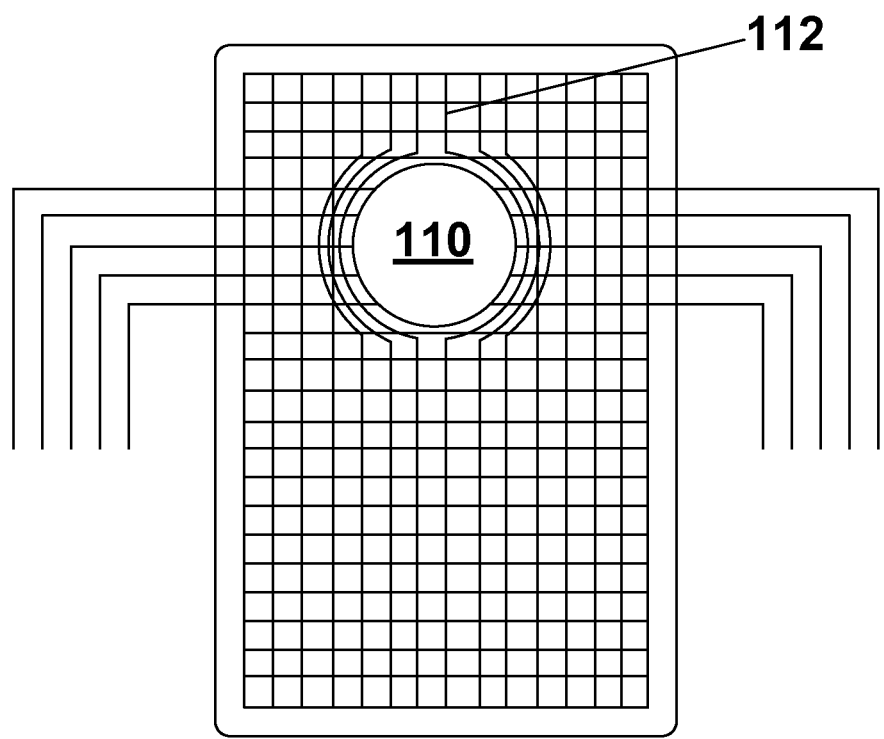
FIGS. 11 and 12 show the arrangement of bus lines in displays of the present invention provided with cut-outs to accommodate various display components.
Figure 12:
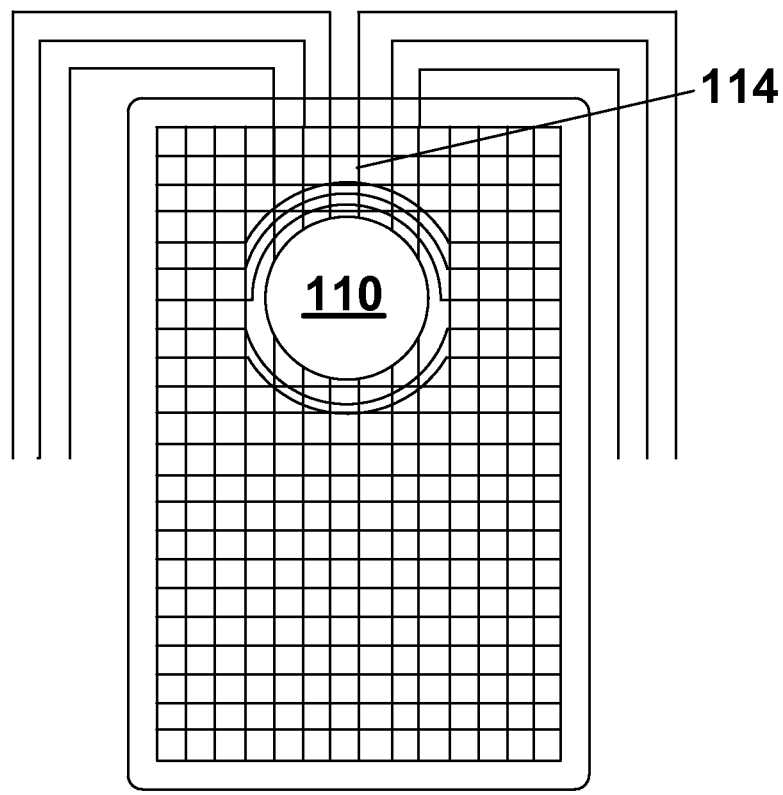

Prior art TFT arrays are typically square or rectangular since this form of array has the advantage of allowing the display area to be addressed with as few bus lines as possible. However, it may be desirable for design reasons to create a display that includes cut-outs for a microphone or speaker, rounded edges, or other non-rectangular designs. Accordingly, the present invention extends to displays in which the pixel array is non-rectangular and/or includes interior holes. FIG. 10 illustrates a non-rectangular display, in which data lines 100 are successively dropped as the width of the display decreases upwardly (as illustrated), while the lengths of the gate bus lines 102 are successively decreased to match the decreasing width. FIGS. 11 and 12 show two examples of displays with through-holes 110. In FIG. 11 source lines 112 are routed around the hole 110 to activate non-contiguous sections of the same column, and separate gate lines are provided for the left and rights sides of the display where the gate liens are divided by the hole 110. Similarly, in FIG. 12 gate lines 114 are routed around the hole 110 to activate non-contiguous sections of the same row, and separate source lines are provided for areas above and below the hole 110 where the source lines are divided by the hole.

Figure 13:
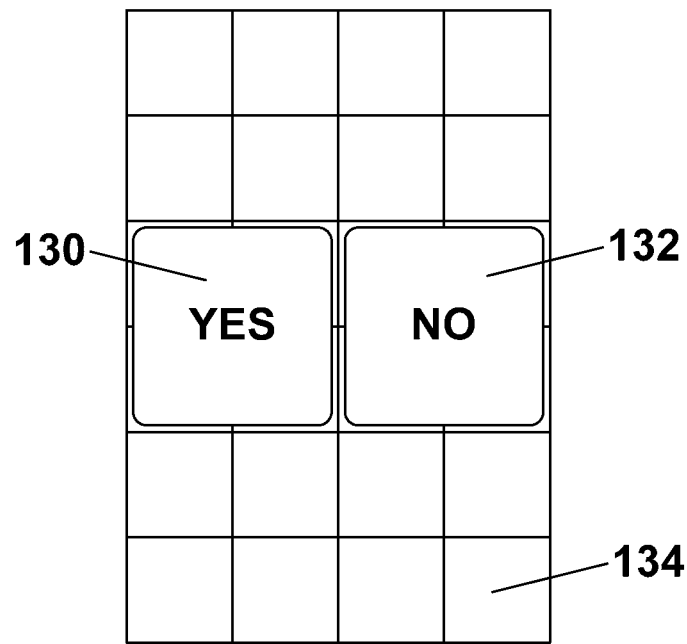
FIG. 13 shows the appearance of a display of the present invention running a program in which large buttons extend over multiple pixels of the display.

In some displays of the present invention, the user interface may require only one or two coarse inputs (for example, yes/no). In such a case, it may be convenient to provide an operating mode of the device where activation of any one of the keys within a pre-defined area produces the same result. Furthermore, the image on the display may outline the physical boundaries of the set of keys that are mapped to the same result. A display of this type is illustrated in FIG. 13, where large "YES" and "NO" buttons 130 and 132 respectively each extend over four of the underlying pixels 134.

Since the present invention eliminates the need for a keypad separate from the display, the display can cover the majority of the device surface. In the case of a so-called "candy bar" cellular telephone, which is long, thin and not hinged, the display may cover one entire major surface of the telephone. In the case of a clamshell telephone, which folds in half along the short axis of the phone, the display/keyboard may be split into two units, each covering one half of the face. Alternatively, the display itself may be made of flexible material and incorporate a bend window that allows it to fold in half along a line coincident with the telephone's hinge, thus giving the appearance, when the telephone is opened, of a single large display covering the face of the telephone.

The touch screen displays shown in FIGS. 6 and 7 above use an air gap front touch screen (i.e., a touch screen which relies upon an air gap between two conductive layers and which is positioned between the electro-optic layer and the viewing surface of the display). Resistive touch sensors can also be constructed of two patterned electrically conductive films separated by a variably resistive material. When the variably conductive material is deformed by applied pressure, its resistance changes; detection of the location and magnitude of this change in resistance by a controlling device will indicate the location and intensity of touch applied to the system. Also, when the appearance of the electro-optic medium used is not significantly affected by manual pressure (as in encapsulated and especially polymer-dispersed electrophoretic media), the touch screen can be placed behind the electro-optic layer (i.e., on the opposed side of the electro-optic layer from the viewing surface of the display.

Figure 14:
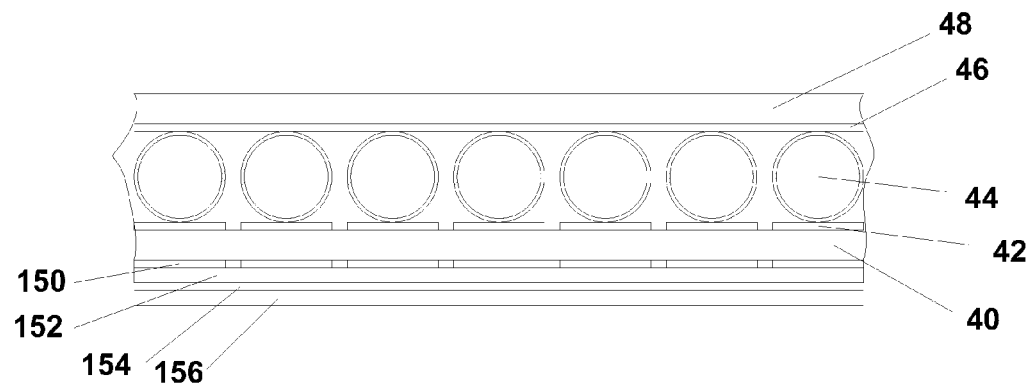
FIG. 14 is a schematic cross-section through a display of the present invention provided with a rear resistive touch screen.

An example of such a touch screen display is shown in FIG. 14. In this display, the substrate 40, the backplane 42, the electro-optic layer 44, the front electrode 46 and the front substrate 48 are all essentially identical to the corresponding parts of the displays shown in FIGS. 6 and 7. However, the display shown in FIG. 14 further comprises an upper conductor 150 of a resistive touch sensor, this upper conductor being patterned into columns, a variably resistive material 152 (typically a liquid), a lower conductor 154 and a lower substrate 156. Although not shown in FIG. 14, the lower conductor 154 is patterned into rows running perpendicular to the columns of upper conductor 150.

Resistive touch sensors that incorporate a variably resistive material typically do not require a large amount of deflection to activate, and thus can be placed behind the backplane of the electro-optic display. In this position, the touch sensor may be activated with pressure applied through the electro-optic display stack as shown in FIG. 14. Advantages of this configuration are that the optically lossy film of the resistive touch sensor is not present between the electro-optic layer and the user viewing the display, so that the contrast ratio and reflectivity of the "naked" display (i.e., the display without the touch sensor) are maintained.

Another touch screen technology which can usefully be used with electro-optic displays is optical touch screen technology, usually in the form of infra-red touch screen technology. (Since optical touch screen technology involves passing beams of radiation across the viewing surface of the display, it is desirable that the radiation used be outside the visible range in order to ensure that no visible streaks of radiation are present on the viewing surface.) However, hitherto the implementation of such optical touch screen technology in electro-optic displays has been rather cumbersome and costly.

Figure 15:
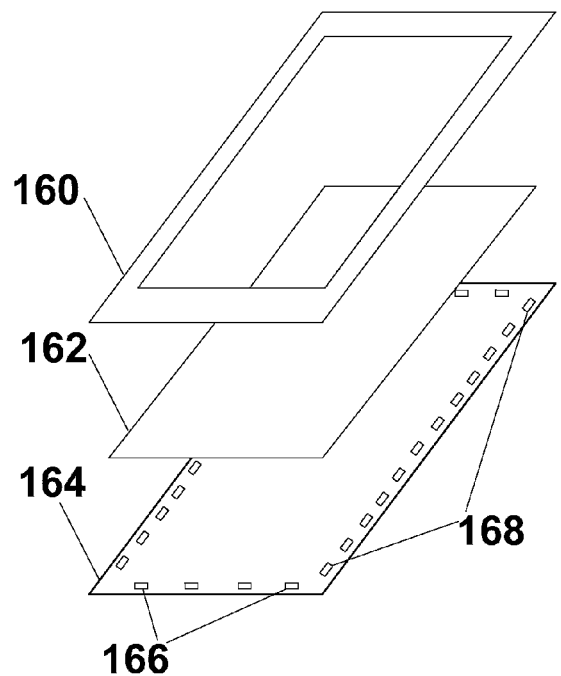
FIG. 15 is an exploded view of a prior art display using an optical touch screen.

As illustrated in FIG. 15, the prior art implementation of optical touch screen technology has typically involved providing the display with a light-deflecting bezel 160, an electro-optic module 162 (which includes the electro-optic layer itself, the front substrate, front electrode and backplane), and a separate rectangular circuit board 164. The circuit board 164 extends outwardly beyond the electro-optic module 162 so that a peripheral portion of the circuit board 164 is exposed, and along two edges of this peripheral portion are arranged infra-red light emitting diodes (LED's) 166, while the other two edges of the peripheral portion carry photodiodes 168 sensitive to the radiation emitted by the LED's 166. The light-deflecting bezel 160 bears light-deflecting surfaces (not shown) such that radiation emitted from the LED's 166 travels perpendicular to the plane of the circuit board 164, is deflected by the bezel 160 so that it travels across and parallel to the viewing surface (the upper surface as illustrated in FIG. 15) of the electro-optic module 162, and it again deflected by the bezel downwardly on to the photodiodes 168. Thus, any object which obstructs the radiation passing across the viewing surface will result in the IR radiation failing to reach at least two of the photodiodes 168, thereby enabling the position of the object to be detected in two dimensions.

Figure 16:
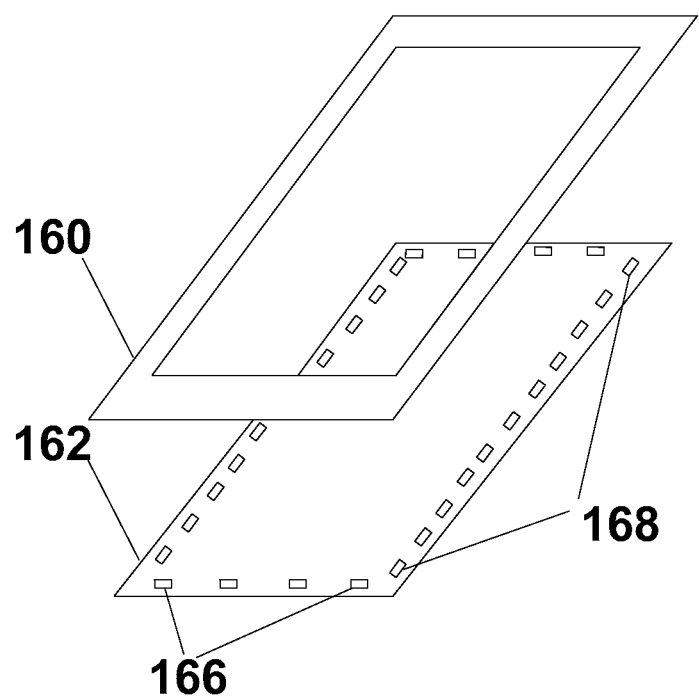
FIG. 16 is an exploded view, similar to that of FIG. 15, of an optical touch screen of the present invention.

FIG. 16 shows an IR optical touch screen display of the present invention. This display has a light-deflecting bezel 160 identical to that shown in FIG. 15. However, the display of FIG. 16 does not require a discrete circuit board; instead, the backplane of the electro-optic module 162 is made larger than the corresponding module in FIG. 15. More specifically, although not shown in FIG. 16, the backplane of the electro-optic module is made larger than the electro-optic layer itself, so that a peripheral portion of the backplane is exposed, on this peripheral portion of the backplane bears LED's 166 and photodiodes 168 which function in the same manner as the corresponding integers in FIG. 15.

The LEDs 166 and photodiodes 168 in FIG. 16 can be mounted directly on the electro-optic module and are adhered to the glass or other backplane using a z-axis conductive adhesive. Electrical connections to the LEDs and photodiodes can be deposited on the backplane using traditional TFT metal layer deposition techniques already used for forming other connection on the backplane, for example those use to connect the row and column drivers of a backplane to the row and column electrodes of an active matrix backplane.

Photodiodes can be constructed such that they have a single wire serial interface whereby one diode sends its data to the next who then appends its own data to that received from the previous photodiode. In this manner the number of connections to the photodiode array can be minimized.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display comprising, in order:
   a light-transmissive electrically-conductive layer;
   a layer of a solid electro-optic material; and
   a backplane bearing a plurality of pixel electrodes, a peripheral portion of the backplane extending outwardly beyond the layer of solid electro-optic material, the peripheral portion of the backplane bearing a plurality of radiation generating means and a plurality of radiation detecting means, the plurality of radiation generating means being arranged to direct radiation across the light-transmissive electrically-conductive layer of the display, and the plurality of radiation detecting means being arranged to detect radiation from the plurality of radiation generating means that has passed across the light-transmissive electrically-conductive layer of the display so that the plurality of radiation generating means and plurality of radiation detecting means together act as a touch screen.

2. An electro-optic display according to claim 1 wherein the radiation generating means comprises a plurality of light emitting diodes emitting in the infra-red region.

3. An electro-optic display according to claim 1 wherein the radiation detecting means comprises a plurality of photodiodes.

4. An electro-optic display comprising, in order:
   a light-transmissive electrically-conductive layer;
   a layer of a solid electro-optic material; and
   a backplane bearing a plurality of pixel electrodes, a peripheral portion of the backplane extending outwardly beyond the layer of solid electro-optic material, the peripheral portion of the backplane bearing a plurality of radiation generating means and a plurality of radiation detecting means, the plurality of radiation generating means being arranged to direct radiation across the light-transmissive electrically-conductive layer of the display, and the plurality of radiation detecting means being arranged to detect radiation from the plurality of radiation generating means that has passed across the light-transmissive electrically-conductive layer of the display so that the plurality of radiation generating means and plurality of radiation detecting means together act as a touch screen, the display comprising a light-deflecting bezel arranged to deflect radiation from the radiation generating means across the light-transmissive electrically-conductive layer, and thence on to the radiation detecting means.

5. An electro-optic display according to claim 4 wherein the electro-optic material comprises an electrophoretic material comprising a plurality of electrically charged particles disposed in a fluid and capable of moving through the fluid under the influence of an electric field.

6. An electro-optic display according to claim 5 wherein the electrically charged particles and the fluid are confined within a plurality of capsules or micro cells.

7. An electro-optic display according to claim 5 wherein the electrically charged particles and the fluid are present as a plurality of discrete droplets surrounded by a continuous phase comprising a polymeric material.

8. An electro-optic display according to claim 5 wherein the fluid is gaseous.

\* \* \* \* \*